Feb. 26, 1929.

J. W. H. BALES

TRAP

Filed Jan. 5, 1928

J. W. H. Bales, Inventor

By C. A. Snow & Co.

Attorneys.

Patented Feb. 26, 1929.

1,703,288

UNITED STATES PATENT OFFICE.

JAMES W. H. BALES, OF COOLIDGE, GEORGIA.

TRAP.

Application filed January 5, 1928. Serial No. 244,675.

It is the object of this invention to provide a trap which will be adapted to catch raccoons, pole cats, and similar animals, the construction of the trap being such that swine and other domestic animals will not be likely to be caught accidentally in it.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

The trap includes a drum-like metal casing 1 in one end wall 3 of which is mounted a tube 2, the inner end of the tube 2 being spaced from the opposite end wall of the casing 1, the tube 2 having a flared mouth 5 which projects beyond the end wall 3.

Figure 1:
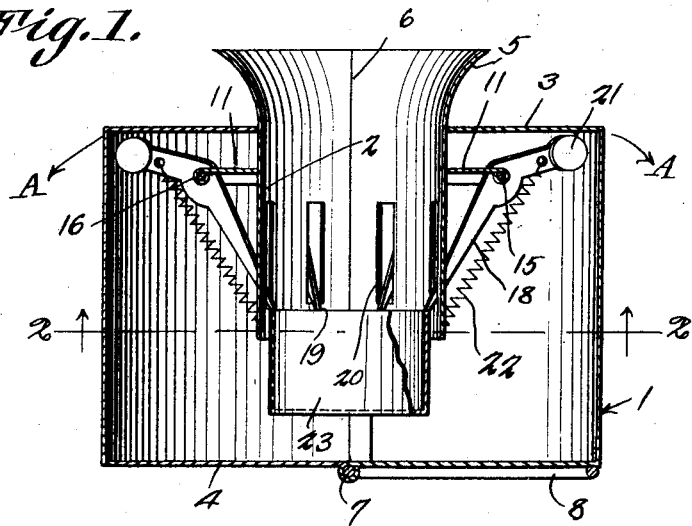
Figure 1 shows in longitudinal section, a device constructed in accordance with the invention.

The casing 1 and the tube 2 are divided longitudinally as shown at 6 to form laterally separable parts which can be swung open in the direction of the arrows A in Figure 1 when it is desired to release the game or clean out the casing 1. The parts of the casing 1 that form the end wall 4 are connected by a hinge 7, so that the casing 1 can be opened as aforesaid. The hinge pintle is formed by a portion of a bail 8 which is used to carry the trap about, or to make it fast in any particular place. The casing 1 is held releasably closed, and in the condition of Figure 1, by means of spring latches 9, each of the laterally separable parts of the casing 1 having one of the latches, and each of the laterally separable parts of the casing having a keeper 10 wherewith the latch on the other of said parts engages releasably.

Figure 2:
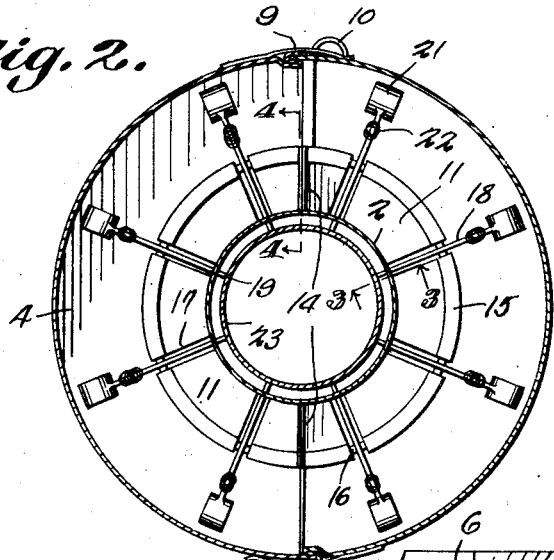
Figure 2 is a transverse section on the line 2—2 of Figure 1.
Figures 3, 4:
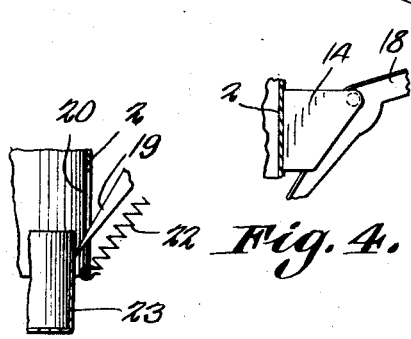
Figure 3 is a section on the line 3—3 of Figure 2.
Figure 4 is a section on the line 4—4 of Figure 2.
Figure 5:
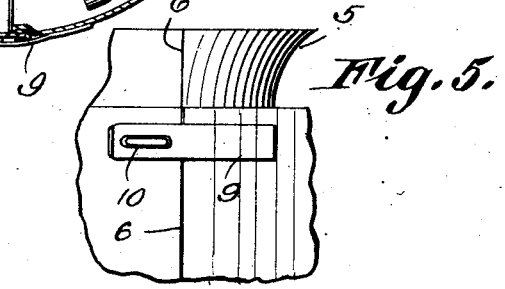
Figure 5 is a fragmental elevation showing one of the latches.

Within the casing 1 are located supports including plate-like semi-circular brackets 11 secured to the parts of the tube 2 and located about at right angles to the axis of the tube. The ends of the brackets 11 have rectangularly disposed flanges 14 that abut, as shown in Figure 2, when the casing 1 is closed to bring the constituent parts of the casing and of the tube 2 together, as shown in Figure 1. The outer edges of the plate-like brackets 11 are turned over to form a bead 15, within which is located a fulcrum member, such as a rod or wire 16. The brackets 11 and the bead 15 are intersected by circumferentially spaced slots 17 that expose parts of the rod 16.

Angular detents 18 extend through the slots 17 in the brackets 11 and are fulcrumed intermediate their ends on the parts of the rod 16 that are exposed by the slots 17. The detents 18 have pointed inner ends 19 that extend through openings 20 formed longitudinally in the tube 2. The pointed ends 19 are acutely disposed with respect to the axis of the tube 2, the construction being such that whereas an animal can shove its foot inwardly without difficulty over the pointed ends 19 of the detents 18, the animal can not withdraw its foot, because, in the withdrawing operation, the foot will be impaled on the pointed inner ends 19 of the detents.

A means is provided for swinging the pointed inner ends 19 of the detents 18 toward the axis of the tube 2. This means may embody weights 21 on the outer ends of the detents 18, and retractile springs releasably connected at their outer ends with the outer ends of the detents 18, and releasably connected at their inner ends with the inner end of the tube 2. A cup-like bait receptacle 23 is mounted for free sliding movement in the tube 2, but because the pointed ends 19 of the detents 18 tend to swing toward the axis of the tube 2 under the urge of the weights 21 and the springs 22, the bait receptacle 23 can be held suspended within the tube 2 by contact with the pointed ends 19 of the detents 18.

When an animal sticks its foot into the tube 2, in an effort to get at the bait in the receptacle 23, the receptacle is easily pushed clear of the ends 19 of the detents 18, and drops into the casing 1, free of the tube 2.

When the animal attempts to haul out its foot, the foot will be caught on the pointed ends 19 of the detents 18.

Some prefer to omit the bait receptacle 23 and place the bait directly in the casing 1, below the tube 2. At times, for instance when the casing 1 is vertically disposed as in Figure 1, or when the bait receptacle 23 is not used, some trappers prefer to dispense with the springs 22 and rely on the weights 21. This is possible, because the springs 22 are connected detachably with the outer ends of the detents 18 and with the end of the tube 2. The springs 22 are a very desirable feature of the trap, however.

When it is desired to release the animal or clean the trap, the latches 9 can be cast off the keepers 10, and the trap opened in the direction of the arrows A, on the hinge 7.

What is claimed is:—

1. A trap comprising a drum-like casing, a tube at one end of the casing, detents extending into the tube at an acute angle to the axis of the tube, a bait receptacle slidable in the tube and retained releasably by the inner ends of the detents, and means for swinging the detents to cause their inner ends to move toward the axis of the tube and to retain the bait receptacle releasably as aforesaid.

2. A trap comprising a drum-like casing having an end wall, a tube secured to the end wall and extended into the casing, detents extended into the tube and housed by the casing and the end wall, means for mounting the detents for swinging movement between the tube and the casing; the casing, the end wall, and the tube, being divided to form laterally separable members, and means for holding said members together releasably.

In testimony that I claim the foregoing as my own, I have hereto affixed my signature.

JAMES W. H. BALES.